J. S. Palmer.
Manufacture of Jewelry.
№ 72224.   Patented Dec. 17, 1867.
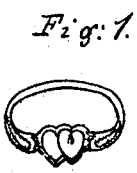   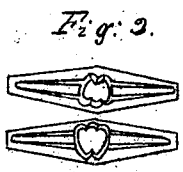      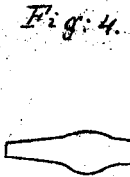   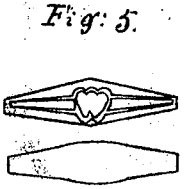
Fig: 1.   Fig: 2.   Fig: 3.   Fig: 4.   Fig: 5.
Fig: 6.
Witnesses
Isaac H. Brownell.
William Brownell.
Inventor
John S. Palmer.

United States Patent Office.

JOHN S. PALMER, OF PROVIDENCE, RHODE ISLAND.

Letters Patent No. 72,224, dated December 17, 1867; antedated December 11, 1867.

IMPROVEMENT IN THE MANUFACTURE OF JEWELRY.

The Schedule referred to in these Letters Patent and making part of the same.

TO ALL WHOM IT MAY CONCERN:

Be it known that I, JOHN S. PALMER, of the city and county of Providence, and State of Rhode Island, have invented certain new and useful Improvements in Making Jewelry; and I do hereby declare that the following is a full and exact description of the same, reference being had to the accompanying drawings, making part of this specification, in which—

Figure 1 is a perspective view of a finger-ring made in accordance with my said improvement.

Figure 2 is a plan of opposite sides of the struck-up shell used in making such ring.

Figure 3 is a plan of opposite sides of the alloy-filling used in making such ring.

Figure 4 is the lining-plate employed in the formation of said ring.

Figure 5 is a plan of opposite sides of the said shell, filling, and lining, united in a blank.

Figure 6 represents the form into which the blank (formed by uniting the said parts) is next wrought, by rolling, to give it the requisite shape to be converted into a ring, by bending and soldering the extreme ends together.

The usual mode of making shell jewelry is to raise the shell-piece from thin sheet stock, with all the fine figures and ornamentation in perfect form, by means of a suitable die and former beneath a drop-hammer, and afterwards filling the shell with chips or grains of solder and then applying the lining-piece and uniting the two pieces together by the flame of a blow-pipe or other means of melting the solder within the shell. By this method, however, the stock was required to be of such quality, thickness, and the shape and ornamentation of the shell were required to be of such a character as would resist the degree of heat, and not be melted or injured by the melting of the solder within it.

By the method which I have invented, I am enabled to work stock which is very much thinner than that heretofore employed, and without being limited or restricted in the quality, or shape, or ornamentation, as heretofore; and my invention, to this end, consists in striking up or raising the shell of a mere form or outline of the shape into which it is finally to be wrought, and in raising a shape or outline piece of solder or filling, which will fit into the said shell, and then applying the lining-piece, and melting the whole together, and after clipping the piece thus produced to remove the superfluous stock, by rolling or otherwise, shaping and ornamenting the piece in the form and manner desired to produce the complete and finished design.

In the drawings, fig. 2 is the shell as it is raised in the die, it being, as will be seen by comparison with fig. 6, merely the general outline of the form required, and fig. 3 is the shape of solder or filling which is produced by punching from the sheet, and afterwards raising in a die beneath a drop. This piece is intended to fit into the shell quite nicely, but it is essential that it should fit completely and exactly in the bottom of the shell, and fit rather loosely at the top thereof, so that when the solder melts it will be sure to fill the deeper portions of the shell first, and by that means prevent the formation of air-bubbles on the surface of the shell by confining air between the shell and the filling. The sheet or lining-plate, fig. 4, is then placed over the filling-piece, and the whole subjected to a heat that will melt the filling and unite the three pieces into a solid mass, as shown in fig. 5. This piece is then clipped in the usual way to remove the thin fin of metal surrounding the shell, and the shell is then placed in a die having the form of the scale, (of the two heats,) and one of the sides, as shown in fig. 6, and this die, with the shell in it, is passed between a pair of rolls, after the manner set forth in Letters Patent, No. 24,432, granted to me, June 14, 1859, and the shell-piece rolled into perfect form, with the required ornamental figures, the said piece being delivered in the form shown in fig. 6. This piece is then bent into its circular shape, and the extreme ends soldered together, and after being polished the ring is completed.

This method of first producing the general outline of a piece of jewelry, and after filling to roll or otherwise cement it into its perfect ornamental shape, enables me to use a requisite thickness of shell to withstand the heat required to melt the filling, and afterwards to reduce and draw out the stock to a degree of thinness to which it could not possibly be reduced or worked by any process hitherto employed in making this class of work, and although I have only described above the process of making finger-rings by this method, it will readily be understood that the said method is also applicable to the making of other articles of jewelry in which the metal shape produced by uniting an external shell and filling is capable of being reduced by the process of rolling mentioned, or an equivalent operation, to the complete and perfect form, with its required ornamentation.

What I claim, and desire to secure by Letters Patent, is—

1. Forming the raised metal shell merely of the general outline of the shape in which it is finally to be produced, substantially as and for the purpose specified.

2. Forming the alloy filling of a shape to fit the interior of the said shell, in one piece or shape, substantially as and for the purpose specified.

3. Reducing the said outline shell and the filling, after the same have been united into one piece, as described, to its perfect finished shape, and ornamenting the same by rolling or other suitable means, substantially in the manner described.

In testimony whereof, I have hereunto set my hand, this nineteenth day of November, A. D. 1866.

JOHN S. PALMER.

Witnesses:
 ISAAC A. BROWNELL,
 WILLIAM BROWNELL.